(12) United States Patent
Yen et al.

(10) Patent No.: US 11,010,291 B2
(45) Date of Patent: May 18, 2021

(54) COLD AREA DETERMINING METHOD, MEMORY CONTROLLING CIRCUIT UNIT AND MEMORY STORAGE DEVICE

(71) Applicant: PHISON ELECTRONICS CORP., Miaoli (TW)

(72) Inventors: Shao-Fan Yen, Taipei (TW); Chih-Chieh Hsu, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/592,780

(22) Filed: Oct. 4, 2019

(65) Prior Publication Data

US 2021/0056018 A1 Feb. 25, 2021

(30) Foreign Application Priority Data

Aug. 23, 2019 (TW) .................... 108130145

(51) Int. Cl.
*G06F 12/02* (2006.01)

(52) U.S. Cl.
CPC .. *G06F 12/0246* (2013.01); *G06F 2212/7201* (2013.01); *G06F 2212/7205* (2013.01); *G06F 2212/7209* (2013.01)

(58) Field of Classification Search
CPC ......... G06F 12/0246; G06F 2212/7211; G06F 2212/7201; G06F 2212/7205; G06F 2212/7209; G06F 2212/7204; G06F 2212/72
See application file for complete search history.

(56) References Cited

U.S. PATENT DOCUMENTS

| | | | | |
|---|---|---|---|---|
| 2003/0163631 A1* | 8/2003 | Aasheim | ............. | G06F 12/0246 711/103 |
| 2018/0341557 A1* | 11/2018 | Koo | .................... | G06F 11/1441 |
| 2019/0056888 A1* | 2/2019 | Kwon | .................... | G06F 3/064 |
| 2019/0196963 A1* | 6/2019 | Byun | ................... | G06F 12/0253 |
| 2020/0110544 A1* | 4/2020 | Zhu | ....................... | G06F 3/0647 |

\* cited by examiner

*Primary Examiner* — Tracy A Warren
(74) *Attorney, Agent, or Firm* — JCIPRNET

(57) ABSTRACT

A cold area determining method, a memory controlling circuit unit, and a memory storage device are provided. The method includes: recording a plurality of logical update counts respectively corresponding to a plurality of logical units; calculating a plurality of reference update counts respectively corresponding to the plurality of physical erasing units according to the plurality of logical update counts; calculating a reference value according to a plurality of first logical update counts respectively corresponding to a plurality of first logical units; and determining at least one first physical erasing unit belonging to a cold area among the plurality of physical erasing units according to the reference value and the plurality of reference update counts.

22 Claims, 10 Drawing Sheets

| Lower physical programming unit | Center physical programming unit | Upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

FIG. 5B

| Physical erasing unit | 510(0) | 510(1) | 510(2) | 510(3) | 510(4) | 510(5) |
|---|---|---|---|---|---|---|
| Reference update count | 50 | 33 | 22 | 75 | 40 | 25 |
| (Reference value)−(Reference update count) | 0 | 17 | 28 | −25 | 10 | 25 |
| Cold area | X | O | O | X | X | O |

| Physical erasing unit | 510(77) | 510(58) | 510(62) | 510(28) | 510(200) | 510(210) |
|---|---|---|---|---|---|---|
| Valid data count | 312 | 298 | 301 | 250 | 330 | 333 |
| Reference update count | 50 | 33 | 22 | 75 | 40 | 25 |
| (Reference value)− (Reference update count) | 0 | 17 | 28 | −25 | 10 | 25 |
| Cold area | X | O | O | X | X | O | ning units. The memory management circuit is coupled to

COLD AREA DETERMINING METHOD, MEMORY CONTROLLING CIRCUIT UNIT AND MEMORY STORAGE DEVICE

CROSS-REFERENCE TO RELATED APPLICATION

This application claims the priority benefit of Taiwan application serial no. 108130145, filed on Aug. 23, 2019. The entirety of the above-mentioned patent application is hereby incorporated by reference herein and made a part of this specification.

BACKGROUND

1. Technology Field

The invention relates to a cold area determining method, a memory controlling circuit unit and a memory storage device.

2. Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive is a memory storage device, which utilizes a flash memory as its storage medium. For these reasons, flash memories have become an import part of the electronic industries.

In general, physical erasing units in the rewritable non-volatile memory module may be further divided into physical erasing units belonging to a "cold area" or physical erasing units belonging to a "hot area". In particular, data in the physical erasing units belonging to the hot area is accessed at a higher frequency than a frequency at which data in the cold area is accessed. Therefore, finding a way to identify whether the physical erasing unit belongs to the cold area or the hot area is one of the problems to be solved by those skilled in the art.

SUMMARY

The invention provides a cold area determining method, a memory controlling circuit unit and a memory storage device which can effectively identify the physical erasing units belonging to the cold area.

The invention proposes a cold area determining method for a rewritable non-volatile memory module. The rewritable non-volatile memory module has a plurality of physical erasing units, and each physical erasing unit among the physical erasing units has a plurality of physical programming units. The cold area determining method includes: recording a plurality of logical update counts respectively corresponding to a plurality of logical units; calculating a plurality of reference update counts respectively corresponding to the plurality of physical erasing units according to the plurality of logical update counts; calculating a reference value according to a plurality of first logical update counts among the plurality of logical update counts respectively corresponding to a plurality of first logical units among the plurality of logical units; and determining at least one first physical erasing unit belonging to a cold area among the plurality of physical erasing units according to the reference value and the plurality of reference update counts.

The invention proposes a memory controlling circuit unit configured to control a rewritable non-volatile memory module. The memory controlling circuit unit includes a host interface, a memory interface and a memory management circuit. The host interface is configured to couple to a host system. The memory interface is configured to couple to a rewritable non-volatile memory module. The rewritable non-volatile memory module has a plurality of physical erasing units, and each physical erasing unit among the physical erasing units has a plurality of physical programming units. The memory management circuit is coupled to the host interface and the memory interface. The memory management circuit is configured to perform the following operations: recording a plurality of logical update counts respectively corresponding to a plurality of logical units; calculating a plurality of reference update counts respectively corresponding to the plurality of physical erasing units according to the plurality of logical update counts; calculating a reference value according to a plurality of first logical update counts among the plurality of logical update counts respectively corresponding to a plurality of first logical units among the plurality of logical units; and determining at least one first physical erasing unit belonging to a cold area among the plurality of physical erasing units according to the reference value and the plurality of reference update counts.

The invention proposes a memory storage device. The memory storage device includes a connection interface unit, a rewritable non-volatile memory module and a memory controlling circuit unit. The connection interface unit is configured to couple to a host system. The rewritable non-volatile memory module has a plurality of physical erasing units, and each physical erasing unit among the physical erasing units has a plurality of physical programming units. The memory controlling circuit unit is coupled to the connection interface unit and the rewritable non-volatile memory module. The memory controlling circuit unit is configured to perform the following operations: recording a plurality of logical update counts respectively corresponding to a plurality of logical units; calculating a plurality of reference update counts respectively corresponding to the plurality of physical erasing units according to the plurality of logical update counts; calculating a reference value according to a plurality of first logical update counts among the plurality of logical update counts respectively corresponding to a plurality of first logical units among the plurality of logical units; and determining at least one first physical erasing unit belonging to a cold area among the plurality of physical erasing units according to the reference value and the plurality of reference update counts.

The invention proposes a cold area determining method for a rewritable non-volatile memory module. The rewritable non-volatile memory module has a plurality of physical erasing units, and each physical erasing unit among the physical erasing units has a plurality of physical programming units. The cold area determining method includes: recording a plurality of logical update counts respectively corresponding to a plurality of logical units; according to a valid data count table for recording a plurality of valid data counts respectively corresponding to the plurality of physical erasing units, selecting a plurality of candidate physical erasing units from the plurality of physical erasing units, wherein when the plurality of valid data counts are arranged in an order from small to large, the valid data counts of the plurality of candidate physical erasing units are first k valid data counts located in the order, wherein k is a positive integer; calculating a plurality of reference update counts respectively corresponding to the plurality of candidate physical erasing units according to the plurality of logical update counts; calculating a reference value according to a plurality of first logical update counts among the plurality of logical update counts respectively corresponding to a plurality of first logical units among the plurality of logical units; determining at least one first physical erasing unit belonging to a cold area among the plurality of candidate physical erasing units according to the reference value and the plurality of reference update counts; and selecting at least one source physical erasing unit from the first physical erasing unit to execute a valid data merging operation.

Based on the above, the cold area determining method, the memory controlling circuit unit and the memory storage device of the invention can effectively identify the physical erasing units belonging to the cold area. Furthermore, the cold area determining method of the invention can find the source physical erasing unit for executing the valid data merging operation to prevent the target physical erasing unit in the valid data merging operation from being selected as the source physical erasing unit in the next valid data merging operation.

To make the aforementioned more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

FIG. 5A and FIG. 5B are schematic diagrams illustrating a memory cell storage structure and a physical erasing unit according to the present exemplary embodiment.

DESCRIPTION OF THE EMBODIMENTS

Figure 1:
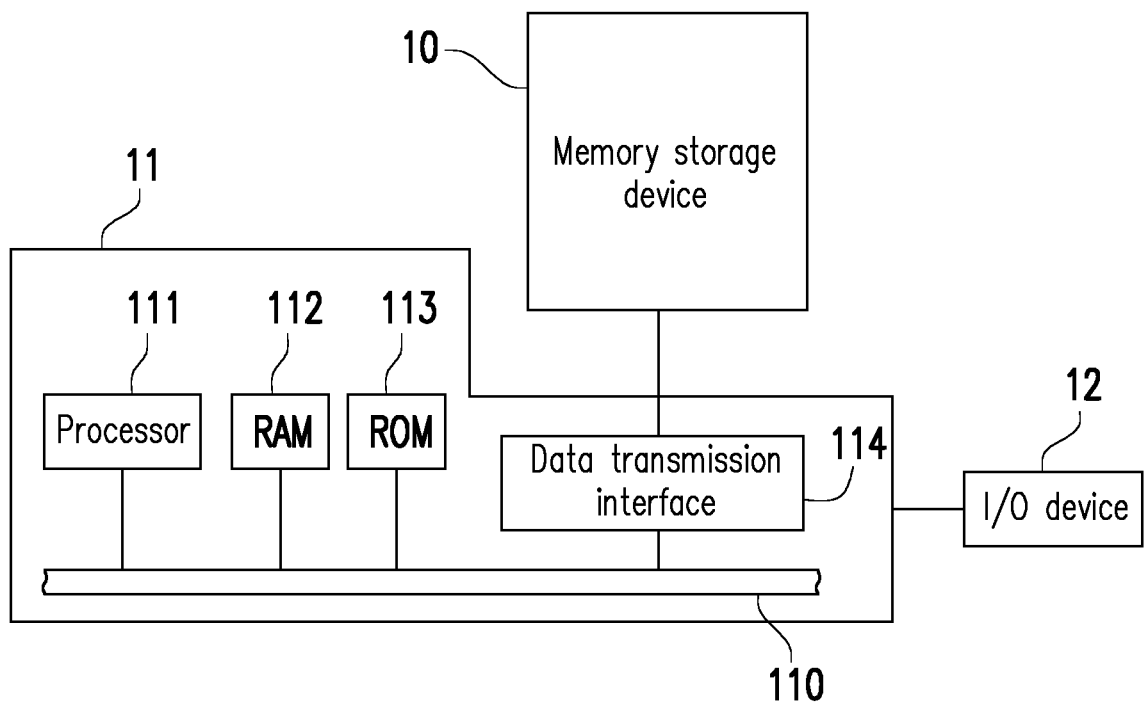
FIG. 1 is a schematic diagram illustrating a host system, a memory storage device and an I/O (input/output) device according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
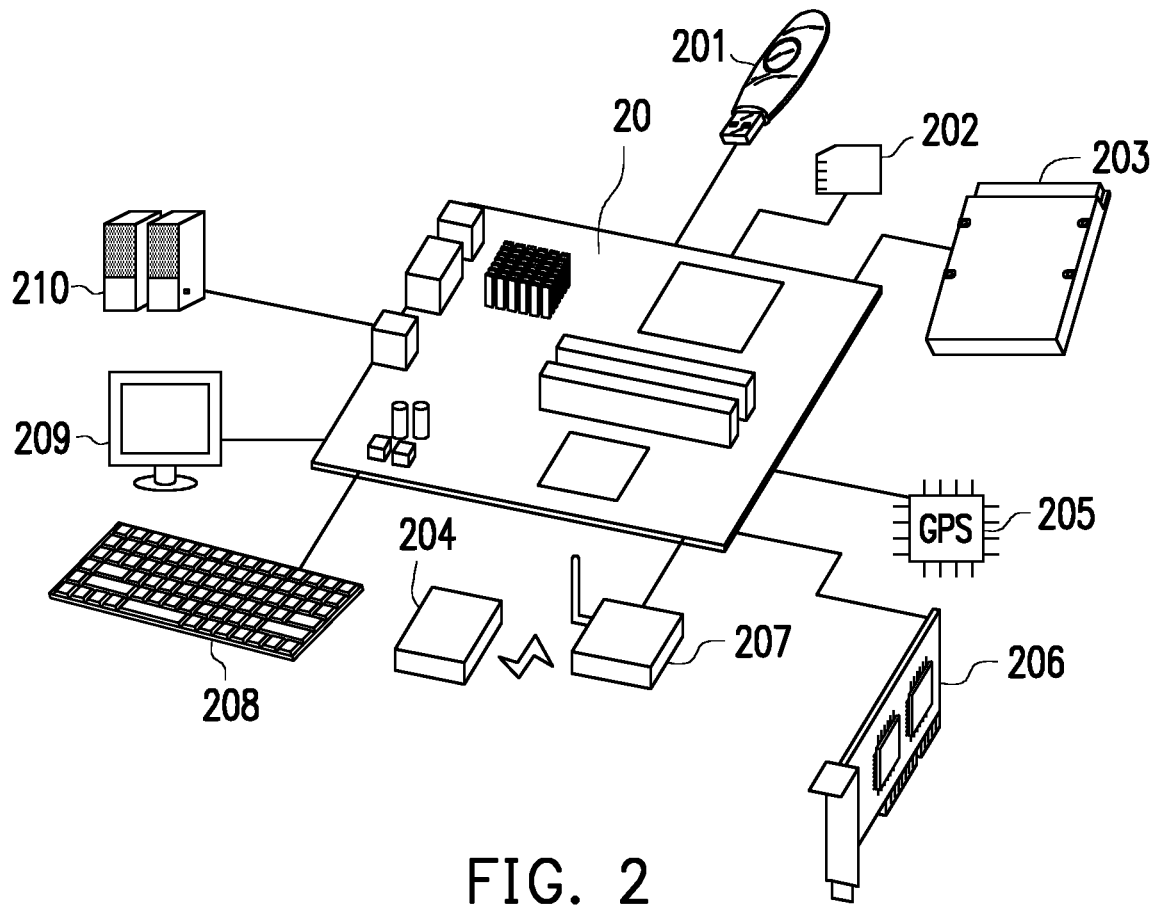
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
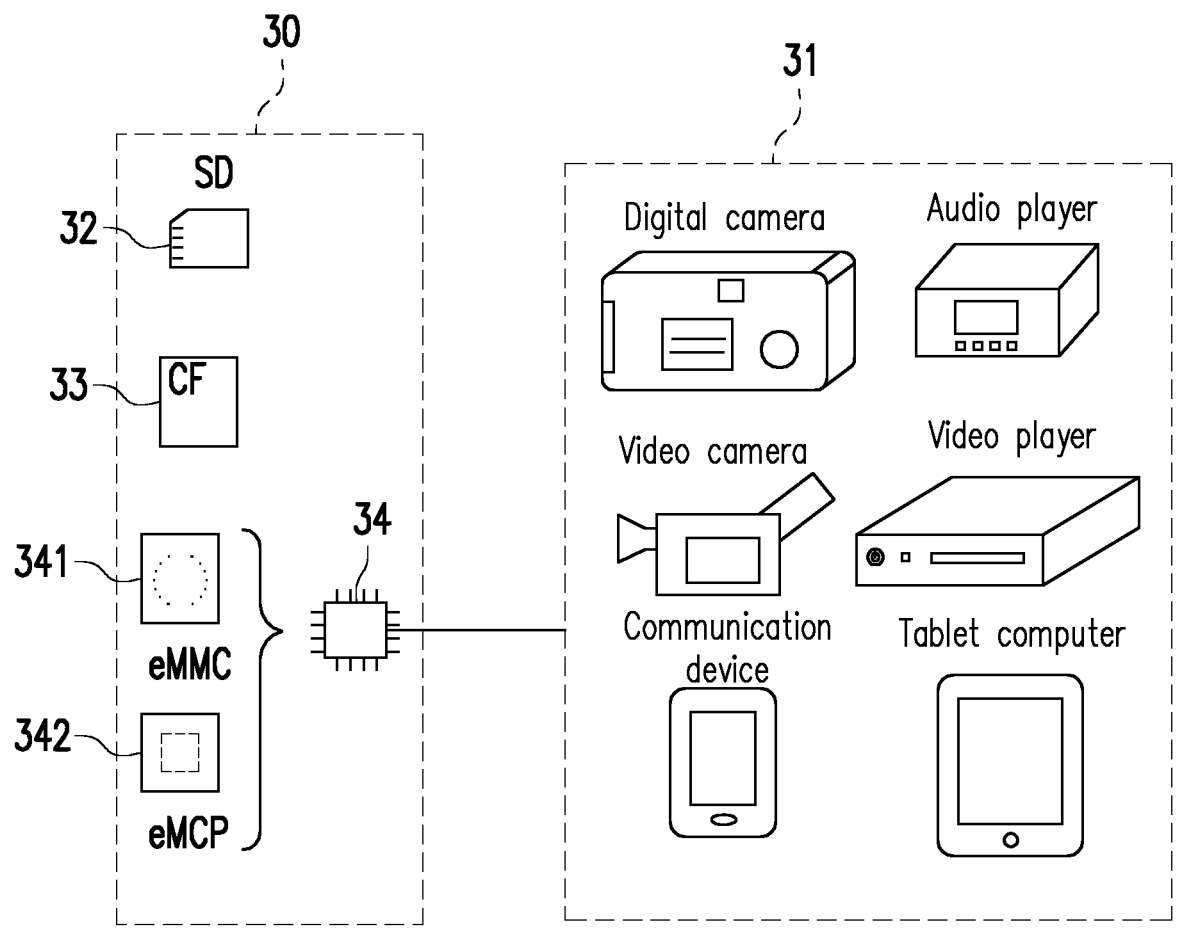
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system including a digital camera, a video camera, a communication device, an audio player, a video player or a tablet computer, whereas a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
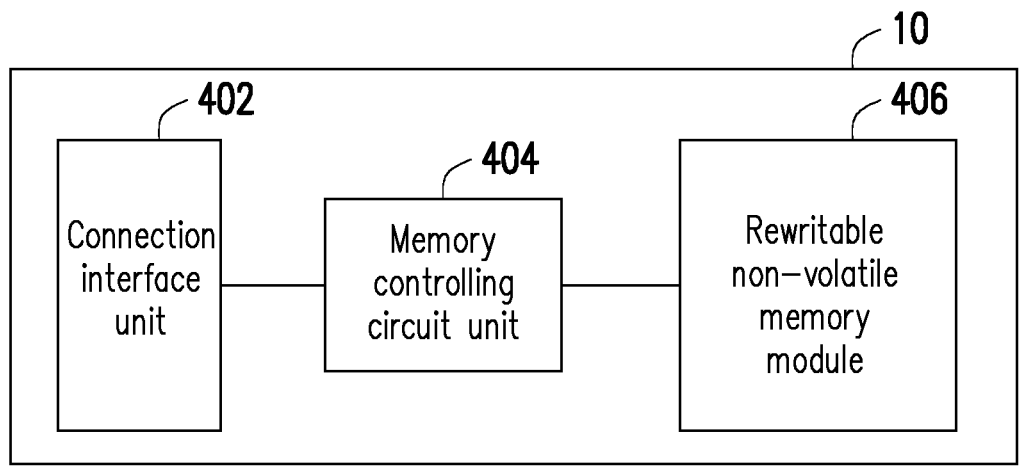
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory controlling circuit unit 404 and a rewritable non-volatile memory module 406.

In this embodiment, the connection interface unit 402 is compatible with a SATA (Serial Advanced Technology Attachment) standard. Nevertheless, it should be understood that the invention is not limited in this regard. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory controlling circuit unit 404 may be packaged into one chip, or the connection interface unit 402 is distributed outside of a chip containing the memory controlling circuit unit 404.

The memory controlling circuit unit 404 is configured to execute a plurality of logic gates or control commands which are implemented in form of hardware or firmware and perform operations of writing, reading erasing and merging data in the rewritable non-volatile memory storage module 406 according to the commands of the host system 11.

The rewritable non-volatile memory module 406 is coupled to the memory controlling circuit unit 404 and configured to store data written from the host system 11. The rewritable non-volatile memory storage module 406 includes physical erasing units 510(0) to 510(N). For example, the physical erasing units 510(0) to 510(N) may belong to the same memory die or belong to different memory dies. Each of the physical erasing units has a plurality of physical programming units (e.g., in the exemplary embodiments of the invention, each of the physical erasing units includes 258 physical programming units), and the physical programming units of the same physical erasing unit may be written separately and erased simultaneously. Nevertheless, it should be understood that the invention is not limited in this regard. Each physical erasing unit may be composed of 64 physical programming units, 256 physical programming units or any number of the physical programming units.

More specifically, the physical erasing unit is a minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundant bit area. The data bit area containing multiple physical access addresses is used for storing user data, and the redundant bit area is used to store system data (e.g., control information and error checking and correcting code). In the present exemplary embodiment, each data bit area of the physical programming unit contains 4 physical access addresses, and the size of each physical access address is 512 byte. However, in other exemplary embodiments, the data bit area may also include more or less of the physical access addresses, and an amount and a size of the physical access addresses are not limited in the invention.

In the present exemplary embodiment of the invention, the rewritable non-volatile memory module 406 is a Trinary Level Cell (TLC) NAND-type flash memory module (i.e., a flash memory module capable of storing three bits data in one memory cell). However, the invention is not limited in this regard. The rewritable non-volatile memory module 406 may also be a Multi Level Cell (MLC) NAND-type flash memory module (i.e., a flash memory module capable of storing two bit data in one memory cell), other flash memory modules or other memory module having the same features.

Figure 5A:
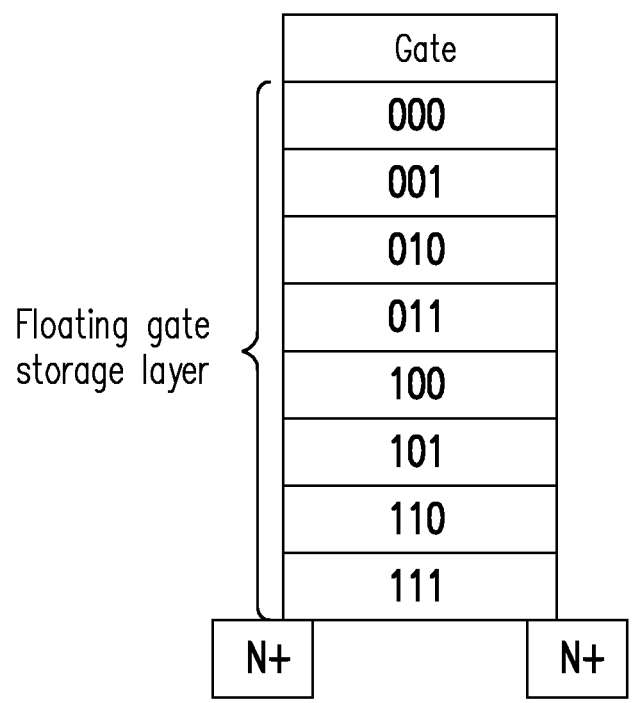

FIG. 5A and FIG. 5B are schematic diagrams illustrating a memory cell storage structure and a physical erasing unit according to the present exemplary embodiment.

Referring to FIG. 5A, each storage state of each memory cell in the rewritable non-volatile memory module 406 can be identified as "111", "110", "101", "100", "011", "010", "001" or "000" (as shown in FIG. 5A). The first bit counted from the left side of the storage state is the LSB, the second bit counted from the left side of the storage state is the CSB and the third bit counted from the left side of the storage state is the MSB. In addition, the memory cells arranged on the same word line can constitute three physical programming units. Here, the physical programming unit constituted by the LSBs of said memory cells is known as the lower physical programming unit, the physical programming unit constituted by the CSBs of said memory cells is known as a center physical programming unit, and the physical programming unit constituted by the MSBs of said memory cells is known as the upper physical programming unit.

Referring to FIG. 5B, one physical erasing unit is constituted by a plurality of physical programming unit groups. Each of the physical programming unit groups includes the lower physical programming unit, the middle physical programming unit and the upper physical programming unit constituted by multiple memory cells arranged on the same word line. For example, in the physical erasing unit, the 0-th physical programming unit belonging to the lower physical programming unit, the 1-st physical programming unit belonging to the center physical erasing unit and the 2-nd physical programming unit belonging to the upper physical programming unit are regarded as one physical programming unit group. Similarly, the 3-rd, the 4-th, and the 5-th physical programming units are regarded as one physical programming unit group, and by analogy, the other physical programming units are also grouped into multiple physical programming unit groups by the same method.

Figure 6:
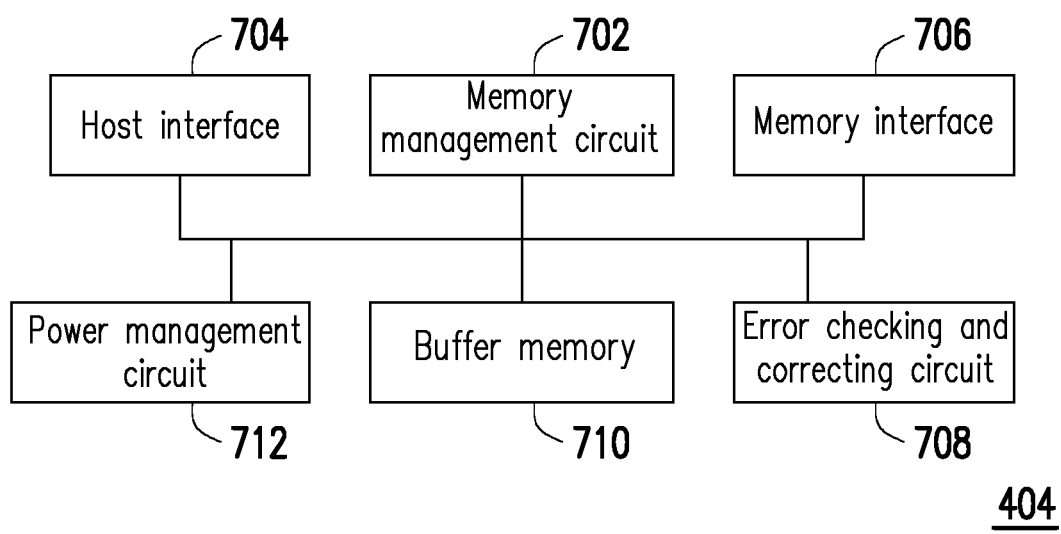
FIG. 6 is a schematic block diagram illustrating a memory controlling circuit unit according to an exemplary embodiment of the invention.

FIG. 6 is a schematic block diagram illustrating a memory controlling circuit unit according to an exemplary embodiment of the invention.

Referring to FIG. 6, the memory controlling circuit unit 404 includes a memory management circuit 702, a host interface 704, a memory interface 706 and an error checking and correcting circuit 708.

The memory management circuit 702 is configured to control overall operations of the memory controlling circuit unit 404. Specifically, the memory management circuit 702 has a plurality of control commands. When the memory storage device 10 operates, the control commands are executed to perform various operations such as data writing, data reading and data erasing. Hereinafter, description regarding operations of the memory management circuit 702 or any circuit element in the memory controlling circuit unit 404 is equivalent to description regarding operations of the memory controlling circuit unit 404.

In this exemplary embodiment, the control commands of the memory management circuit 702 are implemented in form of firmware. For instance, the memory management circuit 702 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 702 may also be stored as program codes in a specific area (for example, a system area in a memory exclusively used for storing system data) of the rewritable non-volatile memory module 406. In addition, the memory management circuit 702 has a microprocessor unit (not illustrated), a ROM (not illustrated) and a RAM (not illustrated). In particular, the ROM has a boot code, which is executed by the microprocessor unit to load the control commands stored in the rewritable non-volatile memory module 406 to the RAM of the memory management circuit 702 when the memory controlling circuit unit 404 is enabled. Then, the control commands are executed by the microprocessor unit to perform operations, such as writing, reading or erasing data.

Further, in another exemplary embodiment, the control commands of the memory management circuit 702 may also be implemented in form of hardware. For example, the memory management circuit 702 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to send a write command sequence for the rewritable non-volatile memory module 406 in order to write data into the rewritable non-volatile memory module 406. The memory reading circuit is configured to send a read command sequence for the rewritable non-volatile memory module 406 in order to read data from the rewritable non-volatile memory module 406. The memory erasing circuit is configured to send an erase command sequence for the rewritable non-volatile memory module 406 in order to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes and instruct the rewritable non-volatile memory module 406 to execute the corresponding operations, such as writing, reading and erasing. In an exemplary embodiment, the memory management circuit 702 may further send command sequences of other types to instruct the rewritable non-volatile memory module 406 to execute the corresponding operations.

The host interface 704 is coupled to the memory management circuit 702 and configured to receive and identify commands and data sent from the host system 11. In other words, the commands and data transmitted by the host system 11 are transmitted to the memory management circuit 702 via the host interface 704. In this exemplary embodiment, the host interface 704 is compatible with the SATA standard. Nevertheless, it should be understood that the invention is not limited in this regard. The host interface 704 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 706 is coupled to the memory management circuit 702 and configured to access the rewritable non-volatile memory module 406. In other words, data to be written into the rewritable non-volatile memory module 406 is converted into a format acceptable by the rewritable non-volatile memory module 406 via the memory interface 706. Specifically, if the memory management circuit 702 intends to access the rewritable non-volatile memory module 406, the memory interface 706 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 702 and transmitted to the rewritable non-volatile memory module 406 via the memory interface 706, for example. The command sequences may include one or more signals, or data transmitted in the bus. The signals or the data may include command codes and program codes. For example, information such as identification codes and memory addresses are included in the read command sequence.

The error checking and correcting circuit 708 is coupled to the memory management circuit 702 and configured to perform an error checking and correcting operation to ensure integrity of data. Specifically, when the memory management circuit 702 receives the writing command from the host system 11, the error checking and correcting circuit 708 generates an error correcting code (ECC) or an error detecting code (EDC) for data corresponding to the writing command, and the memory management circuit 702 writes data and the ECC or the EDC corresponding to the writing command to the rewritable non-volatile memory module 406. Then, when the memory management circuit 702 reads the data from the rewritable non-volatile memory module 406, the corresponding ECC and/or the EDC are also read, and the error checking and correcting circuit 708 performs the error checking and correcting operation on the read data based on the ECC and/or the EDC.

In an exemplary embodiment, the memory controlling circuit unit 404 further includes a buffer memory 710 and a power management circuit 712.

The buffer memory 710 is coupled to the memory management circuit 702 and configured to temporarily store data and commands from the host system 11 or data from the rewritable non-volatile memory module 406. The power management unit 712 is coupled to the memory management circuit 702 and configured to control a power of the memory storage device 10.

In this exemplary embodiment, the error checking and correcting circuit 708 can perform a single-frame encoding for the data stored in the same physical programming unit and can also perform a multi-frame encoding for data stored in multiple physical programming units. Each of the single-frame encoding and the multi-frame encoding may adopt encoding algorithms including at least one of a LDPC (low density parity code), a BCH code, a convolutional code or a turbo code. Alternatively, in another exemplary embodiment, the multi-frame encoding may also include a RS codes (Reed-solomon codes) algorithm or an XOR (exclusive OR) algorithm. Further, in another exemplary embodiment, more of other encoding algorithms not listed above may also be adopted, which are omitted herein. According to the adopted encoding algorithm, the error check and correction circuit 708 can encode the data to be protected, so as to generate the corresponding ECC and/or the EDC. For clear description, the ECC and/or the EDC generated by encoding are collectively referred to as encoded data.

It is noted that in the following description, some terms may be replaced with corresponding abbreviations for ease of reading (see Table 1).

TABLE 1

| rewritable non-volatile memory module | RNVM module |
| --- | --- |
| physical erasing unit | PEU |
| physical programming unit | PPU |
| memory management circuit | MMC |

Figure 7:
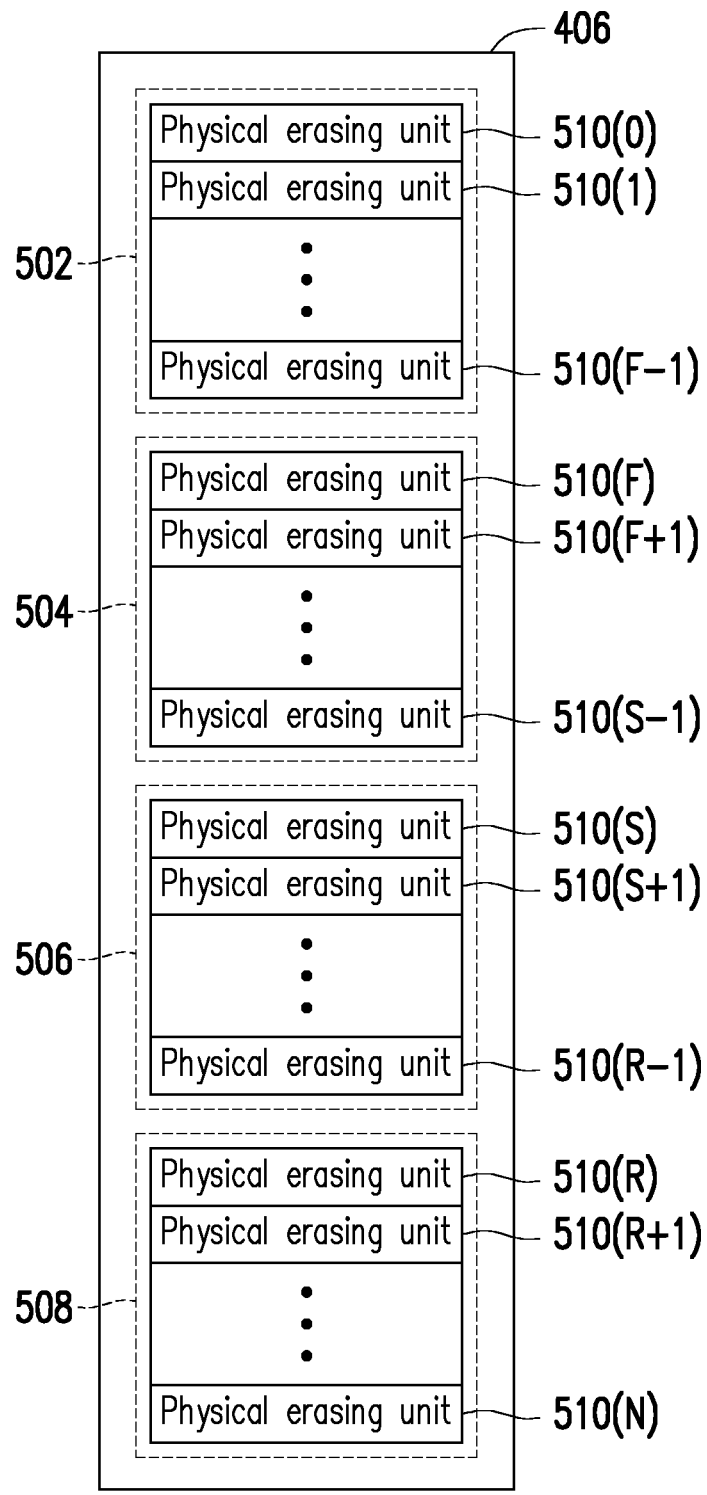
FIG. 7 and FIG. 8 are schematic diagrams illustrating a management of the physical erasing units according to an exemplary embodiment.
Figure 8:
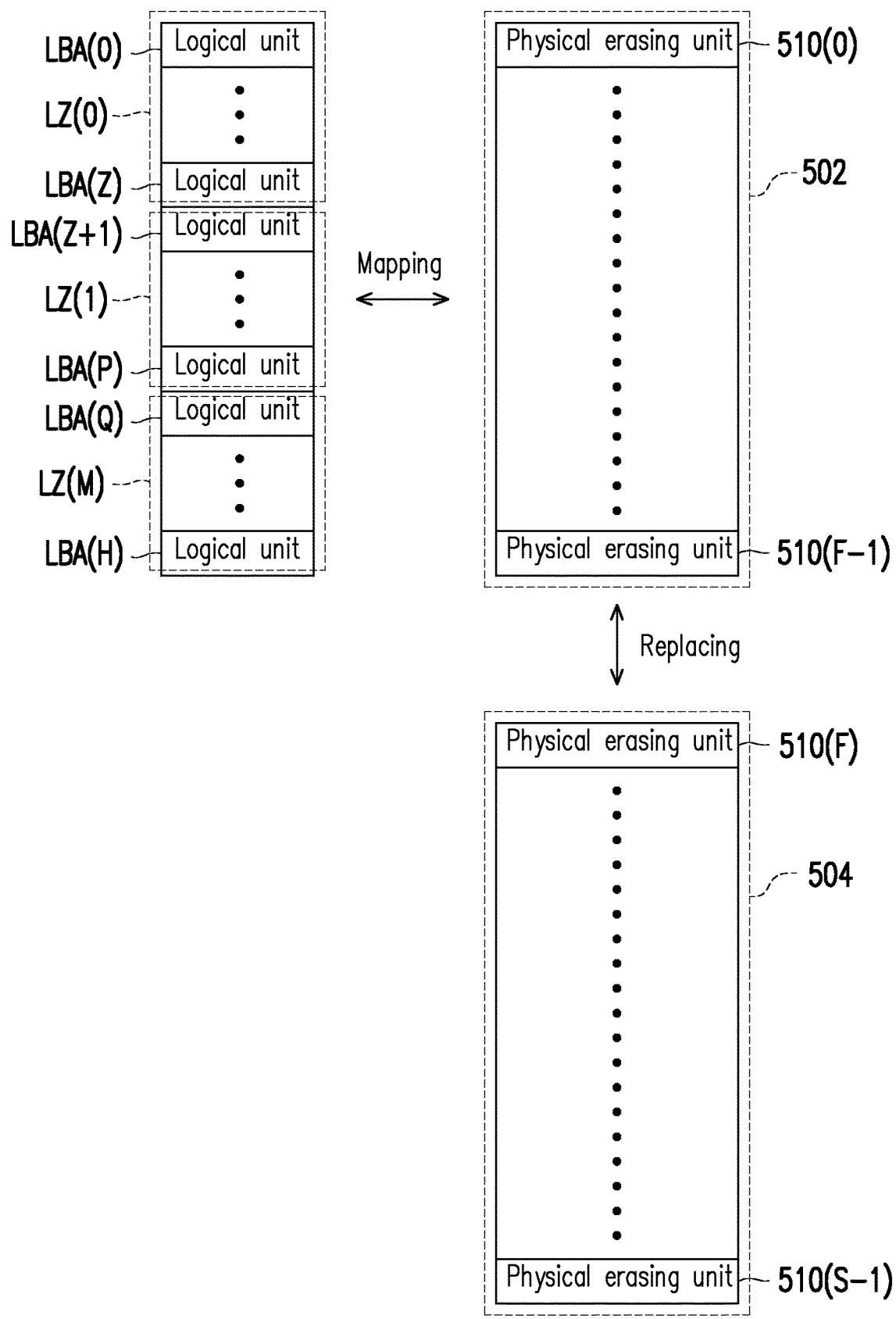

FIG. 7 and FIG. 8 are schematic diagrams illustrating a management of the PEUs according to an exemplary embodiment.

Referring to FIG. 7, the RNVM module 406 has a plurality of PEUs 510(1) to 510(N), which are logically partitioned into a data area 502, a spare area 504, a temporary area 506 and a replacement area 508 by the MMC 702.

The PEUs logically belonging to the data area 502 and the spare area 504 are configured to store data from the host system 11. More specifically, the PEUs of the data area 502 are regarded as the PEUs stored with the data, whereas the PEUs of the spare area 504 are configured to replace the PEUs of the data area 502. In other words, when the write command and the data to be written are received from the host system 11, the MMC 702 retrieves the PEUs from the spare area 504, and writes the data into the retrieved PEUs for replacing the PEUs in the data area 502.

The PEUs logically belonging to the temporary area 506 are configured to record system data. For example, the system data includes a logical-physical mapping table, information related to manufacturer and model of the RNVM module, the number of PEUs in the RNVM module, the number of the PPUs in each PEU, and the like.

The PEUs logically belonging to the replacement area 508 are used in a bad PEU replacement procedure for replacing damaged PEUs. More specifically, if the replacement area 508 still includes normal PEUs when the PEUs in the data area 502 are damaged, the MMC 702 retrieves the normal PEUs from the replacement area 508 for replacing the damaged PEUs.

In particular, the numbers of the PEUs in the data area 502, the spare area 504, the temporary area 506 and the replacement area 508 may be different from one another based on the different memory specifications. In addition, it should be understood that, during operation of the memory storage device 10, grouping relations of the PEUs for associating with the data area 502, the spare area 504, the temporary area 506, and the replacement area 508 may be dynamically changed. For example, when the damaged PEUs in the spare area 504 are replaced by the PEUs in the replacement area 508, the PEUs originally from the replacement area 508 are then associated with the spare area 504.

Referring to FIG. 8, the MMC 702 configures logical units LBA(0) to LBA(H) for mapping to the PEUs in the data area 502, where each of the logical units includes a plurality of logical sub-units for mapping to the PPUs of the corresponding PEUs. Further, when the host system 11 intends to write the data into the logical units or update the data stored in the logical units, the MMC 702 can retrieve one PEU from the spare area 504 as replacement to the PEUs in the data area 502 for writing the data. In the present exemplary embodiment, the logical sub-units may be logical pages or logical sectors.

In order to identify which PEU the data of each logical unit is stored, the MMC 702 can record a mapping between the logical unit and the PEU in this exemplary embodiment. Further, when the host system 11 intends to access the data in the logical sub-unit, the MMC 702 can confirm the logical unit to which the logical sub-unit belongs and access the data in the PEU mapped to the logical unit. For instance, in this exemplary embodiment, the MMC 702 stores logical-physical mapping tables into the RNVM module 406 for recording the PEUs mapped to the logical units, and the logical-physical mapping tables are loaded into the buffer memory 710 for maintenance when the MMC 702 intends to the access the data.

It should be noted that, the mapping table is unable to record the mapping relation for all of the logical units because a capacity of the buffer memory 710 is limited. Therefore, in this exemplary embodiment, it is assumed that the memory management unit 702 groups the logical units LBA(0) to LBA(H) into a plurality of logical zones LZ(0) to LZ(M) and configures one logical-physical mapping table for each of the logical units. In particular, when the memory management unit 702 intends to update the mapping relation for one specific logical unit, the logical-physical mapping table corresponding to the logical zone to which the logical unit belongs may be loaded into the buffer memory 710 for updating. In this exemplary embodiment, the space required for storing all the logical-physical mapping tables is corresponding to 1/1000 of the space in the RNVM module 406 that can be used for storing data. In other words, if the capacity of the RNVM module 406 is 1 TB (Terabyte), the space required for storing all the logical-physical mapping tables is 1 GB (Gigabyte). However, in other exemplary embodiments, the space required for storing each of the logical-physical mapping tables may be changed based on different capacities of the RNVM module 406.

In general, the PEUs in the RNVM module 406 may be further divided into PEUs belonging to a "cold area" or PEUs belonging to a "hot area". In particular, data in the PEUs belonging to the hot area is accessed at a higher frequency than a frequency at which data in the cold area is accessed. Therefore, finding a way to identify whether the PEU belongs to the cold area or the hot area is one of the problems to be solved by those skilled in the art.

In a cold area determining method of the invention, first, the MMC 702 records a plurality of logical update counts for the logical units LBA(0) to LBA(H) in FIG. 8. That is to say, in this embodiment, one logical unit will have one corresponding logical-physical mapping table and one logical update count of the logical unit.

More specifically, when the MMC 702 executes a writing operation (a.k.a. a first writing operation) according to an address of a logical sub-unit (a.k.a. a first logical sub-unit) to write data corresponding to the first logical sub-unit into the RNVM module 406, the MMC 702 updates a write count of a logical unit (a.k.a. a second logical unit) to which the first logical sub-unit belongs. For example, each time the data of the logical sub-unit of the second logical unit is written into the RNVM module 406, the MMC 702 adds one to the write count. Later, when the write count of the second logical unit is equal to a threshold, the MMC 702 updates a logical update count (a.k.a. a second logical update count) of the second logical unit (e.g., by adding one to the logical update count), and sets the write count to zero to start accumulating from zero. In this embodiment, the threshold is the number of the logical sub-units included by one logical unit in the RNVM module 406 (e.g., 1024). That is to say, in this embodiment, when the writing operation is executed 1024 times according to one logical unit, the logical update count of that logical unit is added by one. However, the invention is not intended to limit the threshold. By the above manner, the logical update count of each of the logical units LBA(0) to LBA(H) can be obtained.

Then, the MMC 702 calculates a plurality of reference update counts respectively corresponding to the PEUs 510(0) to 510(S-1) according to the logical update counts of the logical units LBA(0) to LBA(H). That is to say, in this embodiment, each PEU has one reference update count.

Figures 9, 10:
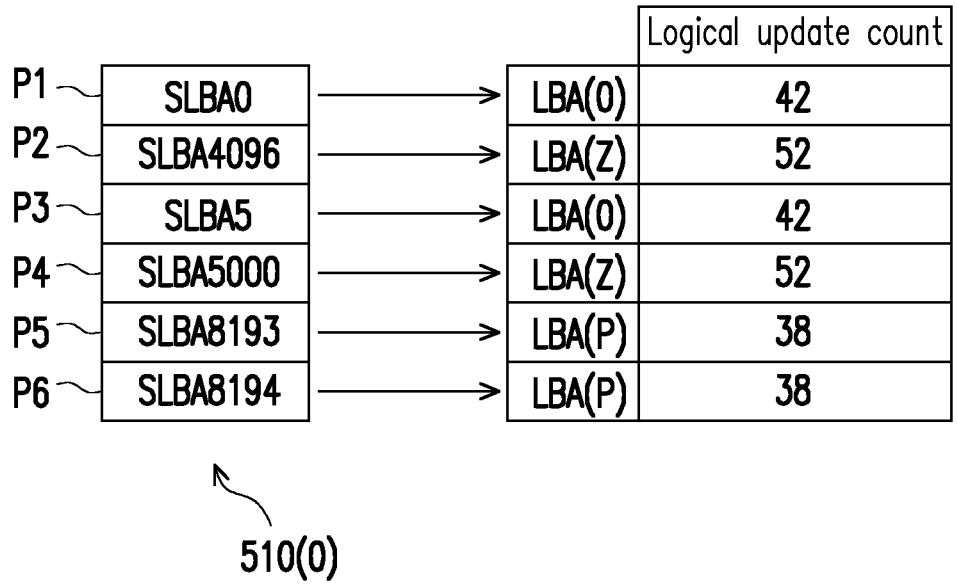
FIG. 9 is a schematic diagram illustrating an example for calculating a reference update count of one physical erasing unit according to an exemplary embodiment.
FIG. 10 is a schematic diagram illustrating an example for determining the physical erasing unit belonging to the cold area according to an exemplary embodiment.

FIG. 9 is a schematic diagram illustrating an example for calculating a reference update count of one PEU according to an exemplary embodiment. It should be noted that, FIG. 9 is an example for calculating the reference update count of the PEU 510(0), and the corresponding reference update counts of the other PEUs in the RNVM module 406 can also be calculated in the same manner.

Referring to FIG. 9 in which the PEU 510(0) (a.k.a. a second PEU) is taken as an example, for simplicity, it is assumed here that the PEU 510(0) only has six PPUs. It is further assumed that a PPU P1 of the PEU 510(0) stores data of a logical sub-unit SLBA0 and the logical sub-unit SLBA0 belongs to the logical unit LBA(0). A PPU P2 of the PEU 510(0) stores data of a logical sub-unit SLBA4096 and the logical sub-unit SLBA4096 belongs to the logical unit LBA(Z). A PPU P3 of the PEU 510(0) stores data of a logical sub-unit SLBA5 and the logical sub-unit SLBA5 belongs to the logical unit LBA(0). A PPU P4 of the PEU 510(0) stores data of a logical sub-unit SLBA5000 and the logical sub-unit SLBA5000 belongs to the logical unit LBA(Z). A PPU P5 of the PEU 510(0) stores data of a logical sub-unit SLBA8193 and the logical sub-unit SLBA8193 belongs to the logical unit LBA(P). A PPU P6 of the PEU 510(0) stores data of a logical sub-unit SLBA8194 and the logical sub-unit SLBA8194 belongs to the logical unit LBA(P).

Then, the MMC 702 obtains each of the logical update counts of the logical units corresponding to the PPUs in the PEU 510(0), and calculates an average value according to the obtained logical update counts as the reference update count of the PEU 510(0). Taking FIG. 9 as example, the MMC 702 obtains the logical update count (e.g., 42) of the logical unit LBA(0) corresponding to the PPU P1 in the PEU 510(0). The MMC 702 obtains the logical update count (e.g., 52) of the logical unit LBA(Z) corresponding to the PPU P2 in the PEU 510(0). The MMC 702 obtains the logical update count (e.g., 42) of the logical unit LBA(0) corresponding to the PPU P3 in the PEU 510(0). The MMC 702 obtains the logical update count (e.g., 52) of the logical unit LBA(Z) corresponding to the PPU P4 in the PEU 510(0). The MMC 702 obtains the logical update count (e.g., 38) of the logical unit LBA(P) corresponding to the PPU P5 in the PEU 510(0). The MMC 702 obtains the logical update count (e.g., 38) of the logical unit LBA(P) corresponding to the PPU P6 in the PEU 510(0). Here, the logical units mapped to the PPUs P1 to P6 in the PEU 510(0) may be referred to as "third logical units" for short, and the logical update counts of the third logical units may be referred as "third logical update counts" for short.

After each of the logical update counts of the logical units corresponding to the PPUs in the PEU 510(0) is obtained, the MMC 702 calculates the average value according to the obtained logical update counts (e.g., ((42+52+42+52+38+38)/6)=44). The MMC 702 then uses this average value as the reference update count of the PEU 510(0). Similarly, the corresponding reference update counts of the other PEUs in the RNVM module 406 can also be calculated in the same manner, which is not repeated hereinafter.

Further, in the exemplary embodiment of the invention, according to a plurality of logical update counts (a.k.a. first logical update counts) of a plurality of logical units (a.k.a. first logical units) respectively used in a plurality of writing operations (a.k.a. second writing operations) recently executed (the last 1024 operations executed), the MMC 702 calculates an average value of the first logical update counts as a reference value.

For example, to simplify the description, it is assumed that the MMC 702 calculates the reference value according to the logical update counts of the logical units respectively used in six writing operations recently executed. It is then assumed that MMC 702 sequentially uses the logical unit LBA(0), the logical unit LBA(Z), the logical unit LBA(0), the logical unit LBA(Z), the logical unit LBA(P) and the logical unit LBA(P) in the six writing operations recently executed. It is further assumed that the logical update count of the logical unit LBA(0) is 42, the logical update count of the logical unit LBA(Z) is 52 and the logical update count of the logical unit LBA(P) is 38. In the operation of calculating the reference value according to the logical update counts of the logical units respectively used in the six writing operations recently executed, the MMC can calculate that the reference value is 44 (i.e., (42+52+42+52+38+38)/6)=44).

After aforementioned calculation is completed, the MMC 702 determines a PEU (a.k.a. a first PEU) belonging to a cold area among the PEUs 510(0) to 510(S-1) according to the reference value and the reference update counts of the PEUs 510(0) to 510(S-1).

For instance, FIG. 10 is a schematic diagram illustrating an example for determining the PEU belonging to the cold area according to an exemplary embodiment. For simplicity, the example of FIG. 10 is described by using only the PEUs 510(0) to 510(5). A similar calculating method can also be applied to the PEUs 510(0) to 510(S-1) in FIG. 8.

Referring to FIG. 10, it is assumed that the reference value is 50 in the example of FIG. 10. Further, it is also assumed that the reference update count of the PEU 510(0) is 50, the reference update count of the PEU 510(1) is 33, the reference update count of the PEU 510(2) is 22, the reference update count of the PEU 510(3) is 75, the reference update count of the PEU 510(4) is 40, and the reference update count of the PEU 510(5) is 25.

In the example of FIG. 10, the MMC 702 further calculates a plurality of differences between the reference value and the reference update counts in FIG. 10, respectively. For example, the difference between the reference value with the value of 50 and the reference update count (with the value of 50) of the PEU 510(0) is 0. The difference between the reference value with the value of 50 and the reference update count (with the value of 33) of the PEU 510(1) is 17. The difference between the reference value with the value of 50 and the reference update count (with the value of 22) of the PEU 510(2) is 28. The difference between the reference value with the value of 50 and the reference update count (with the value of 75) of the PEU 510(3) is -25. The difference between the reference value with the value of 50 and the reference update count (with the value of 40) of the PEU 510(4) is 10. The difference between the reference value with the value of 50 and the reference update count (with the value of 25) of the PEU 510(5) is 25.

After the difference between the reference value and the reference update count is calculated for each PEU, the MMC 702 selects at least one PEU (a.k.a. the first PEU) from the PEUs 510(0) to 510(5) according to the calculated differences to identify the selected first PEU as the PEU belonging to the cold area.

In an embodiment, the MMC 702 arranges the calculated differences in an order from large to small, and picks first i differences (i.e., the largest i differences, a.k.a. a first difference) from the order, so as to identify the PEUs corresponding to the i differences (i.e., the first PEU) as the PEU belonging to the cold area. In the example of FIG. 10, the PEUs 510(0) to 510(5) arranged according to the calculated differences in the order from large to small are the PEU 510(2), the PEU 510(5), the PEU 510(1), the PEU 510(4), the PEU 510(0) and the PEU 510(3) in that sequence. If the value of i is 3, the MMC 702 identifies the PEU 510(2), the PEU 510(5) and the PEU 510(1) as the PEU belonging to the cold area. Meanwhile, the other remaining PEUs will not be identified as the PEU belonging to the cold area. It should be noted that, the value of i is a positive integer.

In another embodiment, the MMC 702 can also pick the difference with the largest value (e.g., 28) from the calculated differences, and identifies only the PEU 510(2) corresponding to such difference as the MMC belonging to the cold area.

Figures 11, 12:
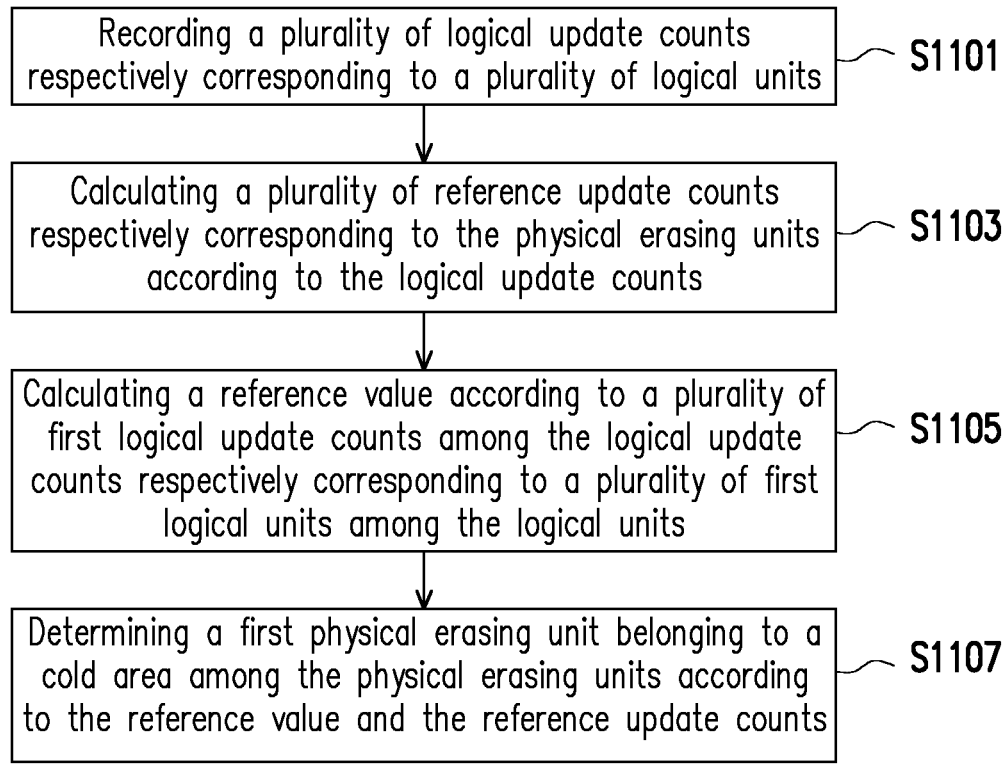
FIG. 11 is a flowchart illustrating a cold area determining method according to an exemplary embodiment.
FIG. 12 is a schematic diagram illustrating an example for selecting a source physical erasing unit of a valid data merging operation from the physical erasing units belonging to the cold area according to an exemplary embodiment.

FIG. 11 is a flowchart illustrating a cold area determining method according to an exemplary embodiment.

Referring to FIG. 11, in step S1101, the MMC 702 records a plurality of logical update counts respectively corresponding to a plurality of logical units. In step S1103, the MMC 702 calculates a plurality of reference update counts respectively corresponding to the PEUs according to the logical update counts. In step S1105, the MMC 702 calculates a reference value according to a plurality of first logical update counts respectively corresponding to a plurality of first logical units among the logical units. Lastly, in step S1107, the MMC 702 determines a first PEU belonging to a cold area among the PEUs according to the reference value and the reference update counts.

In particular, the cold area determining method of the invention can also be applied in a valid data merging operation. In general, when the number of spare PEUs in the spare area 504 in the RNVM module 406 is not greater than a predefined value, the MMC 702 will execute the valid data merging operation. For example, the MMC 702 picks a plurality of PEUs with the least valid data (a.k.a. source PEUs) from the data area 502, and copies the valid data from the source PEUs to a PEU (a.k.a. a target PEU) in the spare area. Then, the MMC 702 executes an erasing operation on the source PEUs and re-associates the source PEUs with the spare area 504 so as to increase the number of the PEUs in the spare area 504. In addition, the MMC 702 further associates the target PEU with the data area 502.

However, it should be noted that, when the source PEUs used for executing the valid data merging operation are the PEUs belonging to a hot area, a probability (or a frequency) that the valid data in the source PEUs are accessed by the MMC 702 is higher. After the valid data in the source PEUs belonging to the hot area are copied to the target PEU, the valid data may be updated again (or immediately) (e.g., the updated data of the valid data are written into another PEU) so that the valid data in the target PEU become invalid data again. Consequently, a valid data count of the target PEU is rapidly reduced and becomes one of candidates for the source PEUs when the next valid data merging operation is performed. In order to prevent the target PEU in the valid data merging operation from being selected as the source PEU in the next valid data merging operation, the cold area determining method of the invention can be used to pick the source PEU for executing the valid data merging operation from the cold area so as to prevent aforesaid situation from happening.

In detail, FIG. 12 is a schematic diagram illustrating an example for selecting a source PEU of a valid data merging operation from the PEUs belonging to the cold area according to an exemplary embodiment.

Referring to FIG. 12, the MMC 702 records a plurality of logical update counts respectively corresponding to the logical units LBA(0) to LBA(H). The method for calculating the logical update counts has been described in detail above, and is thus not repeated hereinafter. In addition, the MMC 702 further establishes a valid data count table for recording the valid data count of each PEU among the PEUs 510(0) to 510(S-1). How to obtain the valid data counts of the PEUs 510(0) to 510(S-1) can refer to the prior art, which is not repeated hereinafter.

In this embodiment, the MMC 702 selects a plurality of candidate PEUs from the PEUs 510(0) to 510(S-1) according to the valid data count table. In this embodiment, the candidate PEUs are first k PEUs with the least valid data counts. In other words, when the valid data counts are arranged in an order from small to large in the valid data count table, the valid data counts of the candidate PEUs are the first k valid data counts located in the order, wherein k is a positive integer. In the embodiment of FIG. 12, it is assumed that the selected candidate PEUs are the PEU 510(77), the PEU 510(58), the PEU 510(62), the PEU 510(28), the PEU 510(200) and the PEU 510(210). In addition, it is also assumed that the valid data count of the PEU 510(77) is 312, the valid data count of the PEU 510(58) is 298, the valid data count of the PEU 510(62) is 301, the valid data count of the PEU 510(28) is 250, the valid data count of the PEU 510(200) is 330, and the valid data count of the PEU 510(210) is 333.

Moreover, the MMC 702 calculates a plurality of reference update counts respectively corresponding to the candidate PEUs according to the logical update counts. How to calculate the reference update count of one PEU has been described in detail above, and is thus not repeated hereinafter. In this embodiment, it is assumed that the reference update count of the PEU 510(77) is 50, the reference update count of the PEU 510(58) is 33, the reference update count of the PEU 510(62) is 22, the reference update count of the PEU 510(28) is 75, the reference update count of the PEU 510(200) is 40, and the reference update count of the PEU 510(210) is 25.

In addition, the MMC 702 further calculates a reference value. For example, according to a plurality of logical update counts (a.k.a. first logical update counts) of a plurality of logical units (a.k.a. first logical units) respectively used in a plurality of writing operations recently executed (the last 1024 operations executed), the MMC 702 calculates an average value of the first logical update counts as the reference value. The example for calculating the reference value has been described above, and is thus not repeated hereinafter. In this embodiment, it is assumed that the reference value is 50.

In the example of FIG. 12, the MMC 702 further calculates a plurality of differences between the reference value and the reference update counts in FIG. 10, respectively. For example, the difference between the reference value with the value of 50 and the reference update count (with the value of 50) of the PEU 510(77) is 0. The difference between the reference value with the value of 50 and the reference update count (with the value of 33) of the PEU 510(58) is 17. The difference between the reference value with the value of 50 and the reference update count (with the value of 22) of the PEU 510(62) is 28. The difference between the reference value with the value of 50 and the reference update count (with the value of 75) of the PEU 510(28) is −25. The difference between the reference value with the value of 50 and the reference update count (with the value of 40) of the PEU 510(200) is 10. The difference between the reference value with the value of 50 and the reference update count (with the value of 25) of the PEU 510(210) is 25.

After the difference between the reference value and the reference update count is calculated for each PEU, the MMC 702 selects at least one PEU (a.k.a. the first PEU) from the candidate PEUs according to the calculated differences to identify the selected first PEU as the PEU belonging to the cold area. The MMC 702 selects at least one PEU from the selected first PEUs as the source PEU for executing the valid data merging operation.

For example, the MMC 702 arranges the calculated differences in an order from large to small, and picks first i differences (i.e., the largest i differences, a.k.a. the first difference) from the order, so as to identify the PEUs corresponding to the i differences (i.e., the first PEU) as the PEU belonging to the cold area. In the example of FIG. 12, the candidate PEUs in FIG. 12 arranged according to the calculated differences in the order from large to small are the PEU 510(62), the PEU 510(210), the PEU 510(58), the PEU 510(200), the PEU 510(77) and the PEU 510(28) in that sequence. If the value of i is 3, the MMC 702 identifies the PEU 510(62), the PEU 510(210) and the PEU 510(58) as the PEU belonging to the cold area. Meanwhile, the other remaining PEUs will not be identified as the PEU belonging to the cold area. It should be noted that, the value of i is a positive integer. The MMC 702 selects at least one PEU from the selected the PEU 510(62), the PEU 510(210) and the PEU 510(58) as the source PEU for executing the valid data merging operation.

In another embodiment, the MMC 702 can also pick the largest difference (e.g., 28) from the calculated differences, and identifies only the PEU 510(62) corresponding to such difference as the PEU of the cold area to be used as the source PEU for executing the valid data merging operation.

Figure 13:
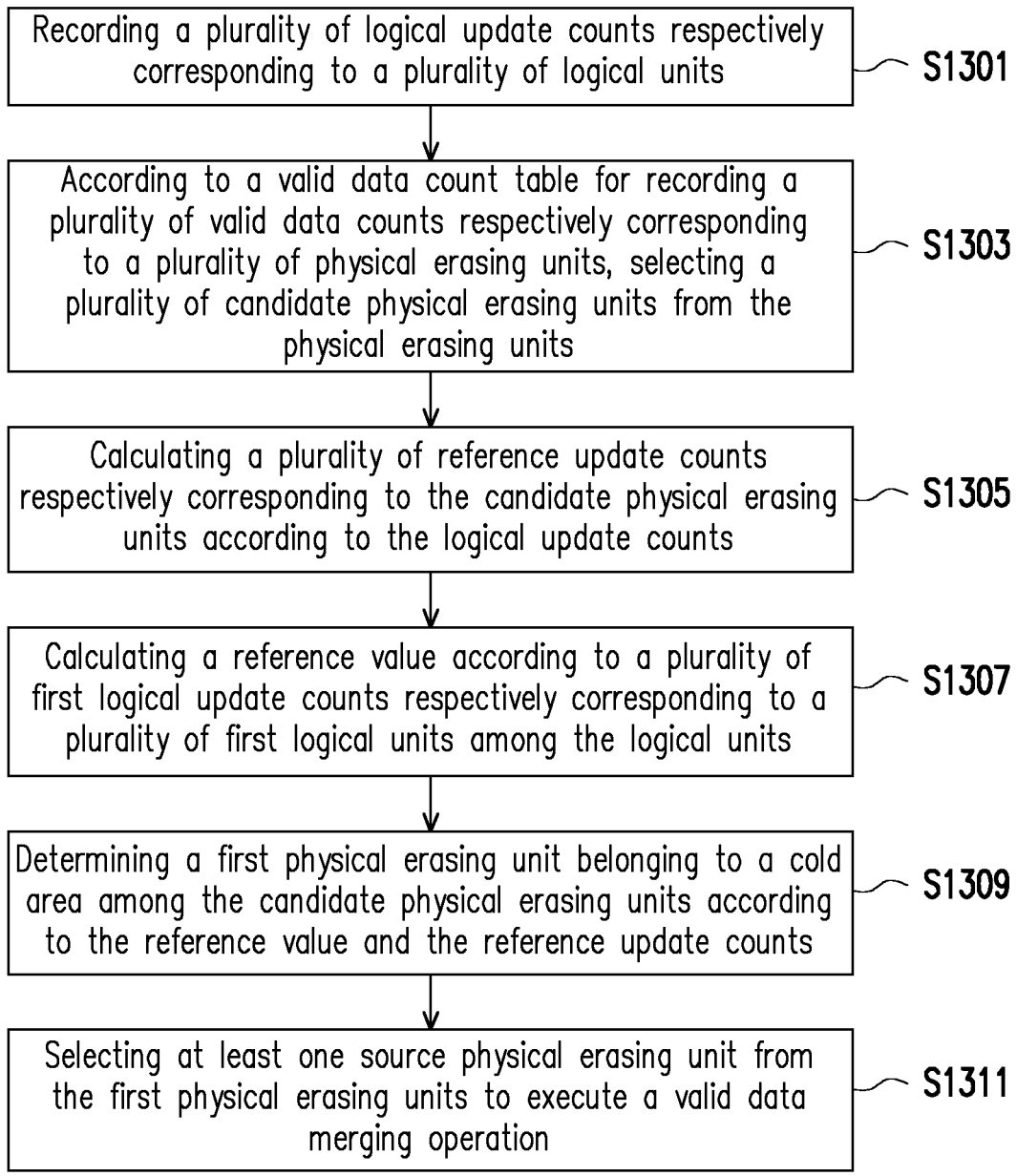
FIG. 13 is a flowchart illustrating a cold area determining method according to another exemplary embodiment.

FIG. 13 is a flowchart illustrating a cold area determining method according to another exemplary embodiment.

Referring to FIG. 13, in step S1301, the MMC 702 records a plurality of logical update counts respectively corresponding to a plurality of logical units, In step S1303, according to a valid data count table for recording a plurality of valid data counts respectively corresponding to a plurality of PEUs, the MMC 702 selects a plurality of candidate PEUs from the PEUs. In step S1305, the MMC 702 calculates a plurality of reference update counts respectively corresponding to the candidate PEUs according to the logical update counts. In step S1307, the MMC 702 calculates a reference value according to a plurality of first logical update counts respectively corresponding to a plurality of first logical units among the logical units. In step S1309, the MMC 702 determines first PEUs belonging to a cold area among the candidate PEUs according to the reference value and the reference update counts. Lastly, in step S1311, the MMC 702 selects at least one source PEU from the first PEUs to execute a valid data merging operation.

In summary, the cold area determining method, the memory controlling circuit unit and the memory storage device of the invention can effectively identify the PEUs belonging to the cold area. Furthermore, the cold area determining method of the invention can find the source PEU for executing the valid data merging operation to prevent the target PEU in the valid data merging operation from being selected as the source PEU in the next valid data merging operation.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the present invention cover modifications and variations of this invention provided they fall within the scope of the following claims and their equivalents.

What is claimed is:

1. A cold area determining method for a rewritable non-volatile memory module, wherein the rewritable non-volatile memory module has a plurality of physical erasing units, each physical erasing unit among the plurality of physical erasing units has a plurality of physical programming units, and the cold area determining method comprises:

recording a plurality of logical update counts respectively corresponding to a plurality of logical units;

calculating a plurality of reference update counts respectively corresponding to the plurality of physical erasing units according to the plurality of logical update counts;

calculating a reference value according to a plurality of first logical update counts among the plurality of logical update counts respectively corresponding to a plurality of first logical units among the plurality of logical units; and determining at least one first physical erasing unit belonging to a cold area among the plurality of physical erasing units according to the reference value and the plurality of reference update counts, wherein the step of determining the first physical erasing unit belonging to the cold area among the plurality of physical erasing units according to the reference value and the plurality of reference update counts comprises:

calculating a plurality of differences between the reference value and the plurality of reference update counts respectively; and selecting the first physical erasing unit from the plurality of physical erasing units according to the plurality of differences to identify the first physical erasing unit as belonging to the cold area.

2. The cold area determining method according to claim 1, wherein the step of recording the plurality of logical update counts respectively corresponding to the plurality of logical units comprises:

when executing a first writing operation according to a first logical sub-unit among a plurality of logical sub-units, updating a write count of a second logical unit among the plurality of logical units to which the first logical sub-unit belongs; and when the write count of the second logical unit is equal to a threshold, updating a second logical update count of the second logical unit among the plurality of logical update counts, and setting the write count of the second logical unit to zero.

3. The cold area determining method according to claim 2, wherein the threshold is the number of the logical sub-units included by one logical unit.

4. The cold area determining method according to claim 1, wherein the step of calculating the plurality of reference update counts respectively corresponding to the plurality of physical erasing units according to the plurality of logical update counts comprises:

according to a plurality of third logical update counts of a plurality of third logical units among the plurality of logical units, calculating the reference update count of a second physical erasing unit among the plurality of physical erasing units, wherein the physical programming units in the second physical erasing unit are mapped to the plurality of third logical units.

5. The cold area determining method according to claim 4, wherein the reference update count of the second physical erasing unit is an average value of the plurality of third logical update counts.

6. The cold area determining method according to claim 1, wherein the step of calculating the reference value according to the plurality of first logical update counts among the plurality of logical update counts respectively corresponding to the plurality of first logical units among the plurality of logical units comprises:

according to the plurality of first logical units corresponding to a plurality of second writing operations recently executed, calculating an average value of the plurality of first logical update counts of the plurality of first logical units as the reference value.

7. The cold area determining method according to claim 1, wherein the number of a first difference corresponding to the first physical erasing unit among the plurality of differences is i, and when the plurality of differences are arranged in an order from large to small, the first difference is first i differences located in the order, wherein i is a positive integer.

8. A memory controlling circuit unit configured to control a rewritable non-volatile memory module, the memory controlling circuit unit comprising:

a host interface, configured to couple to a host system, a memory interface, configured to couple to the rewritable non-volatile memory module, wherein the rewritable non-volatile memory module has a plurality of physical erasing units, and each physical erasing unit among the physical erasing units has a plurality of physical programming units;

a memory management circuit, coupled to the host interface and the memory interface, wherein the memory management circuit is configured to record a plurality of logical update counts respectively corresponding to a plurality of logical u nits, wherein the memory management circuit is further configured to calculate a plurality of reference update counts respectively corresponding to the plurality of physical erasing units according to the plurality of logical update counts, wherein the memory management circuit is further configured to calculate a reference value according to a plurality of first logical update counts among the plurality of logical update counts respectively corresponding to a plurality of first logical units among the plurality of logical units, wherein the memory management circuit is further configured to determine at least one first physical erasing unit belonging to a cold area among the plurality of physical erasing units according to the reference value and the plurality of reference update counts, wherein in the operation of determining the first physical erasing unit belonging to the cold area among the plurality of physical erasing units according to the reference value and the plurality of reference update counts, the memory management circuit is further configured to calculate a plurality of differences between the reference value and the plurality of reference update counts respectively, and the memory management circuit is further configured to select the first physical erasing unit from the plurality of physical erasing units according to the plurality of differences to identify the first physical erasing unit as belonging to the cold area.

9. The memory controlling circuit unit according to claim 8, wherein in the operation of recording the plurality of logical update counts respectively corresponding to the plurality of logical units, when executing a first writing operation according to a first logical sub-unit among a plurality of logical sub-units, the memory management circuit is further configured to update a write count of a second logical unit among the plurality of logical units to which the first logical sub-unit belongs, and when the write count of the second logical unit is equal to a threshold, the memory management circuit is further configured to update a second logical update count of the second logical unit among the plurality of logical update counts, and set the write count of the second logical unit to zero.

10. The memory controlling circuit unit according to claim 9, wherein the threshold is the number of the logical sub-units included by one logical unit.

11. The memory controlling circuit unit according to claim 8, wherein in the operation of calculating the plurality of reference update counts respectively corresponding to the plurality of physical erasing units according to the plurality of logical update counts, according to a plurality of third logical update counts of a plurality of third logical units among the plurality of logical units, the memory management circuit is further configured to calculate the reference update count of a second physical erasing unit among the plurality of physical erasing units, wherein the physical programming units in the second physical erasing unit are mapped to the plurality of third logical units.

12. The memory controlling circuit unit according to claim 11, wherein the reference update count of the second physical erasing unit is an average value of the plurality of third logical update counts.

13. The memory controlling circuit unit according to claim 8, wherein in the operation of calculating the reference value according to the plurality of first logical update counts among the plurality of logical update counts respectively corresponding to the plurality of first logical units among the plurality of logical units, according to the plurality of first logical units corresponding to a plurality of second writing operations recently executed, the memory management circuit is further configured to calculate an average value of the plurality of first logical update counts of the plurality of first logical units as the reference value.

14. The memory controlling circuit unit according to claim 8, wherein the number of a first difference corresponding to the first physical erasing unit among the plurality of differences is i, and when the plurality of differences are arranged in an order from large to small, the first difference is first i differences located in the order, wherein i is a positive integer.

15. A memory storage device, comprising:
a connection interface unit, configured to couple to a host system;
a rewritable non-volatile memory module, wherein the rewritable non-volatile memory module has a plurality of physical erasing units, and each physical erasing unit among the physical erasing units has a plurality of physical programming units; and
a memory controlling circuit unit, coupled to the connection interface unit and the rewritable non-volatile memory module, wherein the memory controlling circuit unit is configured to record a plurality of logical update counts respectively corresponding to a plurality of logical units, wherein the memory controlling circuit unit is further configured to calculate a plurality of reference update counts respectively corresponding to the plurality of physical erasing units according to the plurality of logical update counts, wherein the memory controlling circuit unit is further configured to calculate a reference value according to a plurality of first logical update counts among the plurality of logical update counts respectively corresponding to a plurality of first logical units among the plurality of logical units, wherein the memory controlling circuit unit is further configured to determine at least one first physical erasing unit belonging to a cold area among the plurality of physical erasing units according to the reference value and the plurality of reference update counts, wherein in the operation of determining the first physical erasing unit belonging to the cold area among the plurality of physical erasing units according to the reference value and the plurality of reference update counts, the memory controlling circuit unit is further configured to calculate a plurality of differences between the reference value and the plurality of reference update counts respectively, and the memory controlling circuit unit is further configured to select the first physical erasing unit from the plurality of physical erasing units according to the plurality of differences to identify the first physical erasing unit as belonging to the cold area.

16. The memory storage device according to claim 15, wherein in the operation of recording the plurality of logical update counts respectively corresponding to the plurality of logical units, when executing a first writing operation according to a first logical sub-unit among a plurality of logical sub-units, the memory controlling circuit unit is further configured to update a write count of a second logical unit among the plurality of logical units to which the first logical sub-unit belongs, and when the write count of the second logical unit is equal to a threshold, the memory controlling circuit unit is further configured to update a second logical update count of the second logical unit among the plurality of logical update counts, and set the write count of the second logical unit to zero.

17. The memory storage device according to claim 16, wherein the threshold is the number of the logical sub-units included by one logical unit.

18. The memory storage device according to claim 15, wherein in the operation of calculating the plurality of reference update counts respectively corresponding to the plurality of physical erasing units according to the plurality of logical update counts, according to a plurality of third logical update counts of a plurality of third logical units among the plurality of logical units, the memory controlling circuit unit is further configured to calculate the reference update count of a second physical erasing unit among the plurality of physical erasing units, wherein the physical programming units in the second physical erasing unit are mapped to the plurality of third logical units.

19. The memory storage device according to claim 18, wherein the reference update count of the second physical erasing unit is an average value of the plurality of third logical update counts.

20. The memory storage device according to claim 15, wherein in the operation of calculating the reference value according to the plurality of first logical update counts among the plurality of logical update counts respectively corresponding to the plurality of first logical units among the plurality of logical units,
   according to the plurality of first logical units corresponding to a plurality of second writing operations recently executed, the memory controlling circuit unit is further configured to calculate an average value of the plurality of first logical update counts of the plurality of first logical units as the reference value.

21. The memory storage device according to claim 15, wherein the number of a first difference corresponding to the first physical erasing unit among the plurality of differences is i, and when the plurality of differences are arranged in an order from large to small, the first difference is first i differences located in the order, wherein i is a positive integer.

22. A cold area determining method for a rewritable non-volatile memory module, wherein the rewritable non-volatile memory module has a plurality of physical erasing units, each physical erasing unit among the plurality of physical erasing units has a plurality of physical programming units, and the cold area determining method comprises:
   recording a plurality of logical update counts respectively corresponding to a plurality of logical units;
   according to a valid data count table for recording a plurality of valid data counts respectively corresponding to the plurality of physical erasing units, selecting a plurality of candidate physical erasing units from the plurality of physical erasing units, wherein when the plurality of valid data counts are arranged in an order from small to large, the valid data counts of the plurality of candidate physical erasing units are first k valid data counts located in the order, wherein k is a positive integer;
   calculating a plurality of reference update counts respectively corresponding to the plurality of candidate physical erasing units according to the plurality of logical update counts;
   calculating a reference value according to a plurality of first logical update counts among the plurality of logical update counts respectively corresponding to a plurality of first logical units among the plurality of logical units;
   determining at least one first physical erasing unit belonging to a cold area among the plurality of candidate physical erasing units according to the reference value and the plurality of reference update counts, wherein the step of determining the first physical erasing unit belonging to the cold area among the plurality of candidate physical erasing units according to the reference value and the plurality of reference update counts comprises:
   calculating a plurality of differences between the reference value and the plurality of reference update counts respectively; and
   selecting the first physical erasing unit from the plurality of candidate physical erasing units according to the plurality of differences to identify the first physical erasing unit as belonging to the cold area; and
   selecting at least one source physical erasing unit from the at least one first physical erasing unit to execute a valid data merging operation.

* * * * *